United States Patent
Inaba

(10) Patent No.: US 10,801,435 B2
(45) Date of Patent: Oct. 13, 2020

(54) ENGINE AIR-FUEL RATIO CONTROL DEVICE

(71) Applicant: SUBARU CORPORATION, Tokyo (JP)

(72) Inventor: Takumi Inaba, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 16/435,089

(22) Filed: Jun. 7, 2019

(65) Prior Publication Data

US 2020/0032733 A1    Jan. 30, 2020

(30) Foreign Application Priority Data

Jul. 26, 2018  (JP) ................................ 2018-140424

(51) Int. Cl.
*F02D 41/30* (2006.01)
*B60K 17/04* (2006.01)
*F16H 61/14* (2006.01)

(52) U.S. Cl.
CPC .......... *F02D 41/3005* (2013.01); *B60K 17/04* (2013.01); *F02D 2200/04* (2013.01); *F02D 2200/101* (2013.01); *F02D 2200/1002* (2013.01); *F02D 2200/602* (2013.01); *F16H 61/14* (2013.01)

(58) Field of Classification Search
CPC .. F02D 41/30; F02D 41/3005; F02D 2200/04; F02D 2200/1002; F02D 2200/101; F02D 2200/602; B60K 17/04; F16H 61/14
See application file for complete search history.

(56) References Cited

U.S. PATENT DOCUMENTS

| | | | |
|---|---|---|---|
| 6,493,626 B2 * | 12/2002 | Mitani | B60W 30/1819 701/103 |
| 6,602,165 B2 * | 8/2003 | Ogawa | F02D 41/023 477/107 |
| 10,196,065 B2 * | 2/2019 | Kim | B60W 10/06 |

FOREIGN PATENT DOCUMENTS

JP        2005-172078 A     6/2005

* cited by examiner

*Primary Examiner* — Hieu T Vo
(74) *Attorney, Agent, or Firm* — Troutman Pepper Hamilton Sanders LLP

(57) ABSTRACT

An engine air-fuel ratio control device is configured to be used in a vehicle including a power transmission device configured to transmit power between an output shaft of an engine and an input shaft of a transmission and to execute a lean-burn control that puts an air-fuel ratio of the engine into a lean state. An engine controller executes a fuel injection feedback control such that the air-fuel ratio becomes a lean target value after the power transmission device is released during a deceleration of the vehicle. An engine stall predictor predicts a stall of the engine on a basis of a deceleration indicator that is correlated with a deceleration degree of the vehicle in a state in which the power transmission device is released. A lean-burn control canceler cancels the lean-burn control in a case in which the engine is predicted to stall.

19 Claims, 6 Drawing Sheets

ENGINE AIR-FUEL RATIO CONTROL DEVICE

CROSS-REFERENCE TO RELATED APPLICATIONS

The present application claims priority from Japanese Patent Application No. 2018-140424 filed on Jul. 26, 2018, the entire contents of which are hereby incorporated by reference.

BACKGROUND

The disclosure relates to an engine air-fuel ratio control device. Vehicles provided with a torque converter as a power transmission device that transmits power between an engine and an automatic transmission exist. The torque converter is a device that transmits power via a fluid, and it is known that the power transmission efficiency is lowered. For this reason, a torque converter provided with a lock-up clutch capable of entering a lock-up state that directly connects a rotary element coupled to the engine side with a rotary element coupled to the transmission side is used frequently. In a vehicle provided with a torque converter provided with a lock-up clutch, the vehicle enters the lock-up state when the accelerator throttle is in the fully closed position and the vehicle is coasting, and the fuel consumption is reduced (for example, see Japanese Unexamined Patent Application Publication 2005-172078).

SUMMARY

An aspect of the disclosure provides an engine air-fuel ratio control device configured to be used in a vehicle including a power transmission device configured to transmit power between an output shaft of an engine and an input shaft of a transmission. The engine air-fuel ratio control device is configured to execute a lean-burn control that puts an air-fuel ratio of the engine into a lean state. The engine air-fuel ratio control device includes: an engine controller configured to execute a fuel injection feedback control such that the air-fuel ratio becomes a lean target value after the power transmission device is released during a deceleration of the vehicle; an engine stall predictor configured to predict a stall of the engine on a basis of a deceleration indicator that is correlated with a deceleration degree of the vehicle in a state in which the power transmission device is released; and a lean-burn control canceler configured to cancel the lean-burn control in a case in which the engine is predicted to stall. An aspect of the disclosure provides an engine air-fuel ratio control device configured to be used in a vehicle including a power transmission device configured to transmit power between an output shaft of an engine and an input shaft of a transmission. The engine air-fuel ratio control device is configured to execute a lean-burn control that puts an air-fuel ratio of the engine into a lean state. The engine air-fuel ratio control device includes circuitry. The circuitry is configured to execute a fuel injection feedback control such that the air-fuel ratio becomes a lean target value after the power transmission device is released during a deceleration of the vehicle. The circuitry is configured to predict a stall of the engine on a basis of a deceleration indicator that is correlated with a deceleration degree of the vehicle in a state in which the power transmission device is released. The circuitry is configured to cancel the lean-burn control in a case in which the engine is predicted to stall.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
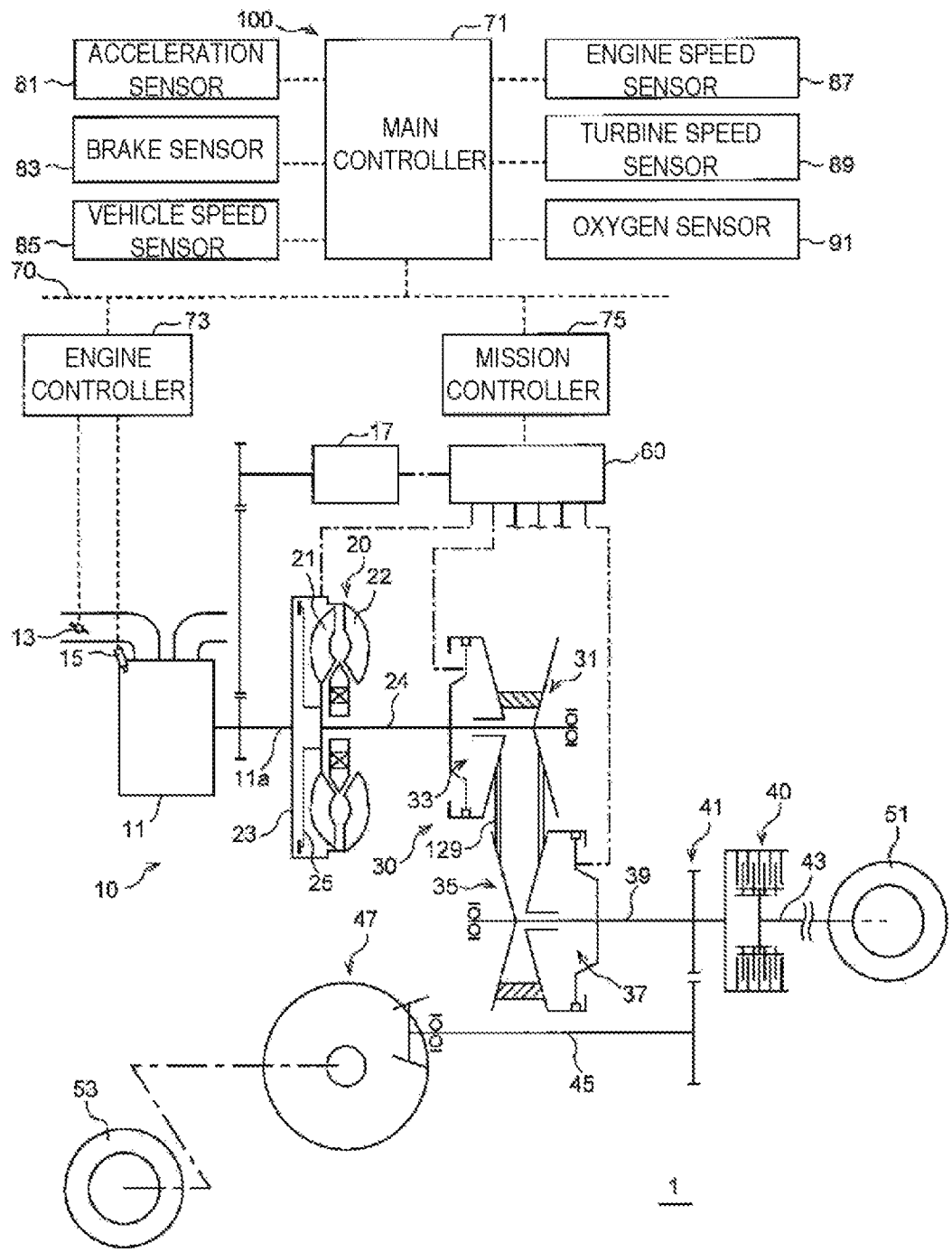
FIG. 1 is a schematic diagram illustrating an exemplary configuration of a vehicle driving system to which the engine air-fuel ratio control device according to an embodiment of the disclosure is applicable.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. In a vehicle provided with an engine, by entering a lock-up state when coasting, the rotation of the engine is maintained due to the turning force of the wheels, but if the vehicle comes to a stop while the lock-up state is being maintained, the engine also stops. In this case, the vehicle is no longer able to start moving unless the driver performs an engine start operation. For this reason, during deceleration in the lock-up state, the lock-up state is released such that an engine stall does not occur in association with the lowering of the rotational speed on the transmission side.

However, in a torque converter provided with a lock-up clutch, even if the lock-up state is released, the rotary element coupled to the engine side is co-rotated by the rotary element coupled to the transmission side. For this reason, when the lock-up state is released, in the case in which the rotational speed on the transmission side is substantially smaller than the engine speed, there is a risk that the engine speed will follow the rotational speed on the transmission side and fall, thereby causing an engine stall to occur. Consequently, to prevent an engine stall after the release of the lock-up state, it is desirable to control the engine such that the engine speed converges on the idle speed while also staying at or under the rotational speed on the transmission side.

The engine is able to reduce fuel consumption by executing a lean-burn control that keeps the air-fuel ratio leaner than the ideal (stoichiometric) air-fuel ratio. The lean-burn control may also be executed during deceleration of the vehicle, but in the case in which the lean-burn control is executed near the idle speed, ignition points become scarce and it is not easy to control the engine output accurately. This is because in the lean-burn control, the ignition point inside the combustion chamber is governed by the air, and the responsiveness of the engine output is low. For this reason, there is a risk that executing the lean-burn control near the idle speed will cause an engine stall to occur or cause a surge in the engine speed to occur.

In light of the above issues, it is desirable to provide an engine air-fuel ratio control device capable of stabilizing the running state of the engine during deceleration of the vehicle.

<1. Overall Configuration of Vehicle Driving System>

First, an exemplary configuration of a vehicle driving system to which the engine air-fuel ratio control device according to an embodiment of the disclosure is applicable will be described. The description hereinafter describes a vehicle provided with an engine as the source of driving force. However, the vehicle may also be a hybrid vehicle provided with an engine and a driving motor as sources of driving force.

FIG. 1 is a schematic diagram illustrating one example of an overall configuration of a driving system 1. Hereinafter, an example of the overall configuration of the driving system 1 will be described, divided into a power unit 10 and a control device (electronic control system) 100. The driving system 1 illustrated in FIG. 1 is a system applied to a four-wheel drive vehicle in which front wheels 53 and rear wheels 51 are configured as driving wheels, but the vehicle may also be a two-wheel drive vehicle in which the front wheels or the rear wheels are configured as driving wheels.

(1-1. Power Unit)

The power unit 10 of the driving system 1 is provided with an engine 11 as a source of driving force. Also, the power unit 10 is provided with a continuously variable transmission (CVT) 30 including a primary pulley 31 and a secondary pulley 35. A torque converter 20 is provided between the engine 11 and the CVT 30. The driving force output from the engine 11 is transmitted to the CVT 30 through the torque converter 20.

The torque converter 20 is provided with a pump impeller 22 and a turbine liner 21. The pump impeller 22 is coupled via a front cover 23 to a crank shaft 11a that is the output shaft of the engine 11. The turbine liner 21 is coupled to a turbine shaft 24 that faces opposite the pump impeller 22. In one implementation, the turbine liner 21 functions as the input shaft of the CVT 30.

A hydraulic oil is supplied inside the torque converter 20, and the driving force of the engine 11 is transmitted from the pump impeller 22 to the turbine liner 21 via the hydraulic oil. Also, the torque converter 20 is provided with a lock-up clutch 25 that directly couples the crank shaft 11a of the engine 11 to the turbine shaft 24.

The CVT 30 is provided with the primary pulley 31, the secondary pulley 35, and a drive belt 34 that acts as a power transmission member that transmits power between the primary pulley 31 and the secondary pulley 35. By controlling the hydraulic pressure supplied to a primary chamber 33 of the primary pulley 31 and a secondary chamber 37 of the secondary pulley 35, the sheave width of each pulley changes.

The drive belt 34 is wound around the primary pulley 31 and the secondary pulley 35. By varying the sheave widths of the primary pulley 31 and the secondary pulley 35 to vary the winding diameter of the drive belt 34, continuous variation of the rotation transmitted from the primary pulley 31 to the secondary pulley 35 becomes possible.

A front-wheel output shaft 45 is coupled to an output shaft 39 of the CVT 30 via a gear train 41. The front wheels (driving wheels) 53 are coupled to one end (in the diagram, the left end) of the front-wheel output shaft 45 via a front differential mechanism 47. Also, a rear-wheel output shaft 43 is coupled to the output shaft 39 via a transfer clutch 40. The transfer clutch 40 switches between transmitting and not transmitting driving force to the rear-wheel output shaft 43. The rear wheels (driving wheels) 51 are coupled to the rear-wheel output shaft 43 via a propeller shaft and a rear differential mechanism not illustrated.

Hydraulic pressure generated by the driving of an oil pump 17 is supplied to the torque converter 20, the primary chamber 33, the secondary chamber 37, and the transfer clutch 40. The oil pump 17 is a mechanical pump coupled to the crank shaft 11a of the engine 11, and is driven using the driving force of the engine 11. The hydraulic oil pumped by the oil pump 17 is supplied to each working part through a valve unit 60. The valve unit 60 is provided with control valves such as solenoid valves, and the amount of hydraulic oil to supply to each working part is controlled according to the working state of each working part. Each control valve provided in the valve unit 60 is controlled by a mission controller 75.

Besides the above, the power unit 10 may also be provided with at least one of a forward/reverse clutch and a center differential mechanism not illustrated. The forward/reverse clutch has a function of switching the direction of the rotation output from the CVT 30 between a forward direction and a reverse direction. The center differential mechanism distributes driving force to the front wheels 53 and the rear wheels 51.

(1-2. Electronic Control System)

Next, an overall configuration of the control device (electronic control system) 100 of the driving system 1 will be described. As illustrated in FIG. 1, to control the working state of the power unit 10, the driving system 1 is provided with various controllers provided with microcontrollers or the like. As the various controllers, the driving system 1 is provided with a main controller 71, an engine controller 73, and the mission controller 75.

All or part of each controller may be configured with a microcontroller, a microprocessor unit, or the like, for example. In addition, all or part of each controller may also be configured to have updatable firmware or the like, and may also be a program module or the like that is executed according to instructions from a CPU or the like.

Additionally, each controller is provided with a storage device not illustrated that stores programs executed by the microcontroller or the like, parameters used in various computations, detection data, information about computed results, and the like. The storage device may be a memory element such as random access memory (RAM) or read-only memory (ROM), for example, and may also be a storage device such as a hard disk drive (HDD), CD-ROM, or storage.

The engine controller 73 controls the engine 11. The mission controller 75 controls the CVT 30, the torque converter 20, and the like. The main controller 71 centrally controls these controllers. These controllers are communicably interconnected through one or multiple in-vehicle networks such as a controller area network (CAN) or a local interconnect network (LIN).

The main controller 71 outputs a control signal to each controller, and controls the engine 11, CVT 30, and the like included in the power unit 10 in coordination with each other. An acceleration sensor 81, a brake sensor 83, a vehicle speed sensor 85, an engine speed sensor 87, a turbine speed sensor 89, and an oxygen sensor 91 are coupled to the main controller 71.

The acceleration sensor 81 detects an amount of manipulation of the accelerator pedal. The brake sensor 83 detects the amount of manipulation of the brake pedal. The vehicle speed sensor 85 detects the vehicle speed. The engine speed sensor 87 detects the engine speed, that is, the rotational speed of the crank shaft 11a. The turbine speed sensor 89 detects the turbine speed, that is, the rotational speed of the turbine shaft 24. The oxygen sensor 91 is provided in an exhaust passage of the engine 11 and detects the concentration of oxygen in the exhaust. The oxygen sensor 91 may be a lambda sensor or may be substituted with another sensor capable of detecting the oxygen concentration.

The main controller 71 sets a control target of the engine 11 and the CVT 30 on the basis of information transmitted from each sensor and controller, and outputs a control signal to each controller on the basis of the set control target. Each controller receiving the control signal from the main controller 71 controls the engine 11, the CVT 30, and the like as follows.

The engine controller 73 outputs a control signal to a throttle valve 13, an injector 15, and the like, and controls the engine torque, the engine speed, and the like. The mission controller 75 outputs a control signal to the valve unit 60 that regulates the pressure of the hydraulic oil, and controls the working state of the CVT 30, the torque converter 20, and the like. In this way, the engine 11, the CVT 30, and the like are controlled by each controller.

<2. Engine Air-Fuel Ratio Control Device>

Next, a specific example of the control device (electronic control system) that functions as the engine air-fuel ratio control device according to the in the embodiment will be described. Note that in the embodiment, the electronic control system that includes multiple controllers functions as the engine air-fuel ratio control device, but in another implementation, a single controller such as the engine controller 73 for example may also function as the engine air-fuel ratio control device.

Figure 2:
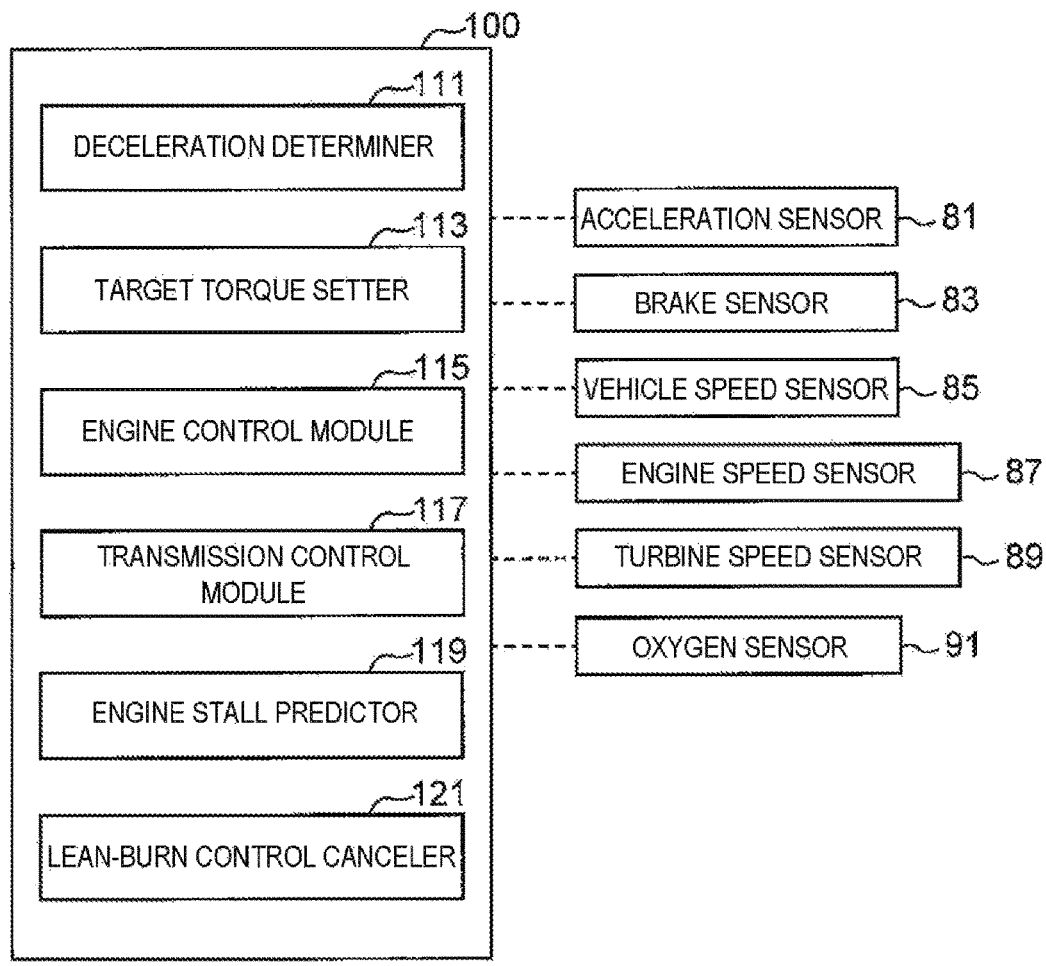
FIG. 2 is a block diagram illustrating an exemplary configuration of the engine air-fuel ratio control device according to the embodiment.

FIG. 2 is an explanatory diagram that illustrates a functional configuration of the portion related to the control of the air-fuel ratio of the engine 11 from among the control device 100 configured by the multiple controllers illustrated in FIG. 1. The control device 100 is provided with a deceleration determiner 111, a target torque setter 113, an engine control module 115, a transmission control module 117, an engine stall predictor 119, and a lean-burn control canceler 121.

Also, the control device 100 may acquire signals output from the acceleration sensor 81, the brake sensor 83, the vehicle speed sensor 85, the engine speed sensor 87, the turbine speed sensor 89, and the oxygen sensor 91. The various information indicated by the acquired signals is stored in a storage device not illustrated.

Note that in the example illustrated in FIG. 1, the various sensors are directly coupled to the main controller 71, but the various sensors may also be coupled to another controller or coupled separately to multiple controllers. In this case, each controller acquires the information indicated by the signals of the various sensors from another controller via an in-vehicle network 70.

(Deceleration Determiner)

For example, in one implementation, the main controller 71 functions as the deceleration determiner 111. The deceleration determiner 111 determines whether the vehicle is in a decelerating state. For example, the deceleration determiner 111 may determine that the vehicle is in a decelerating state in the case in which at least the accelerator throttle is switched to a fully closed position. At this time, the deceleration determiner 111 may also distinguish the degree of deceleration according to the rate of decline of the amount of intake air, the amount of manipulation of the brake pedal, the brake pressure, or the rate of decline (deceleration) of the vehicle speed.

(Target Torque Setter)

For example, in one implementation, the main controller 71 functions as the target torque setter 113. The target torque setter 113 computes the target torque of the engine 11. For example, the target torque setter 113 references a torque map stored in the storage device in advance, and computes the target torque on the basis of the accelerator throttle position.

(Engine Control Module)

For example, in one implementation, the engine controller 73 functions as the engine control module 115. The engine control module 115 controls the engine torque or the engine speed by controlling the valve position of the throttle valve 13 and the electric power supplied to the injector 15 on the basis of the target torque set by the target torque setter 113.

The engine control module 115 is able to execute at least a stoichiometric control that keeps the air-fuel ratio at an ideal air-fuel ratio and a lean-burn control that keeps the air-fuel ratio in a lean state. The lean-burn control is a control that is favorable in reducing fuel consumption, but on the other hand, in the case in which the target torque is small, the lean-burn control is a control in which ignition points are scarce and an engine stall or a surge of the engine speed readily occurs. In contrast, the stoichiometric control is a control in which an engine stall or a surge of the engine speed does not occur readily.

When executing the stoichiometric control and the lean-burn control, the engine control module 115 is able to execute a fuel injection feedback control such that the air-fuel ratio of the engine 11 estimated from the signal output from the oxygen sensor 91 becomes the target air-fuel ratio. The engine control module 115 is able to execute the lean-burn control of the engine 11 at least when the vehicle is decelerating. In this case, when an instruction to cancel the lean-burn control is generated from the lean-burn control canceler 121, the engine control module 115 cancels the lean-burn control of the engine 11 and executes the stoichiometric control.

(Transmission Control Module)

For example, in one implementation, the mission controller 75 functions as the transmission control module 117. The transmission control module 117, by controlling the valve unit 60, controls the CVT 30 in accordance with a shift curve set in advance according to the vehicle speed and the target torque.

Also, by controlling the valve unit 60, the transmission control module 117 switches between the engagement and release of the lock-up clutch 25 of the torque converter 20. The transmission control module 117 engages the lock-up clutch 25 when at least the vehicle is determined to be in a decelerating state by the deceleration determiner 111, and releases the lock-up clutch 25 when the engine speed falls below a reference speed.

(Engine Stall Predictor)

For example, in one implementation, the main controller 71 functions as the engine stall predictor 119. In the case in which the lock-up clutch 25 of the torque converter 20 is released during the lean-burn control of the engine 11, the engine stall predictor 119 predicts an engine stall on the basis of a deceleration indicator that is correlated with the deceleration degree of the vehicle when the lock-up clutch 25 is released. In other words, the engine stall predictor 119 predicts an engine stall according to the deceleration degree of the vehicle when the lock-up clutch 25 is released during the lean-burn control of the engine 11.

The deceleration indicator may be the vehicle deceleration degree itself, for example, but may also be the target torque of the engine 11, the amount of intake air, the brake pressure of the vehicle, or the amount of manipulation of the brake pedal.

Also, in the embodiment, the engine stall predictor 119 predicts an engine stall by comparing the target torque set by the target torque setter 113 to an idle torque that maintains the engine speed at the idle speed. Specifically, in the case in which the target torque falls below the idle torque, the engine stall predictor 119 predicts that the engine 11 will stall.

(Lean-Burn Control Canceler)

For example, in one implementation, the main controller 71 functions as the lean-burn control canceler 121. The lean-burn control canceler 121 causes the lean-burn control to be canceled in the case in which the vehicle enters a state in which the lean-burn control should be canceled when decelerating during the lean-burn control of the engine 11. The lean-burn control canceler 121 causes the lean-burn control to be canceled in the case in which the engine stall predictor 119 predicts that the engine 11 will stall.

Also, in the embodiment, besides following the prediction result of the engine stall predictor 119, the lean-burn control canceler 121 also determines whether to cancel the lean-burn control on the basis of the behavior of the engine speed and the turbine speed. Furthermore, the lean-burn control canceler 121 cancels the lean-burn control in the case in which the rate of decline of the turbine speed exceeds a threshold value, or in other words, when the rate of change in the turbine speed per unit time exceeds a threshold value. Herein, the point at which the rate of change in the turbine speed per unit time exceeds the threshold value is designated the "turbine speed rate-of-decline increase point".

<3. Exemplary Operations of Control Device>

So far, an exemplary configuration of the control device 100 has been described. Hereinafter, exemplary operations of the control device 100 will be described.

(3-1. Overview)

First, an overview of an air-fuel ratio control process of the engine 11 by the control device 100 will be described.

Figure 3:
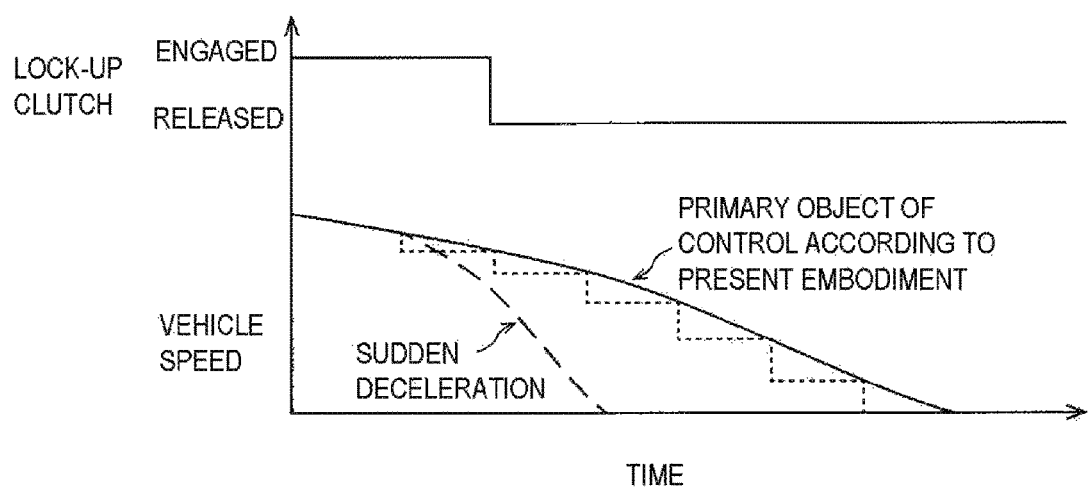
FIG. 3 is an explanatory diagram illustrating the principal object of control by the control device according to the embodiment.

FIG. 3 is an explanatory diagram illustrating the deceleration behavior of a vehicle that serves as the principal object of control by the control device 100 according to the embodiment. During the deceleration of a vehicle in a state with the engine 11 under lean-burn control, to reduce fuel consumption, the lock-up clutch 25 is engaged. Also, when the engine speed falls below the reference speed in association with the drop in the vehicle speed, the lock-up clutch 25 is released such that an engine stall does not occur. After the release of the lock-up clutch 25, the engine 11 is controlled to maintain the engine speed at the idle speed for example.

In the case in which the vehicle decelerates suddenly, regardless of whether the lock-up clutch 25 is engaged or released, there is a risk that the engine speed will also drop suddenly in accordance with the sudden drop in the turbine speed due to the sudden decrease in the rotational speed of the driving wheels, and an engine stall will occur. Such an engine stall occurring during a sudden deceleration of the vehicle is predictable according to whether the deceleration degree of the vehicle exceeds a first threshold value by which a sudden deceleration of the vehicle is determinable. During a sudden deceleration of the vehicle, the running state of the engine 11 is stabilized and an engine stall is inhibited by canceling the lean-burn control of the engine 11 and reverting to the stoichiometric control.

On the other hand, even in the case in which the vehicle is not suddenly decelerating, during the lean-burn control of the engine 11, as the engine speed approaches the idle speed after the release of the lock-up clutch 25, ignition points become scarce, thereby causing an engine stall or a surge of the engine speed to occur more readily. For this reason, the control device 100 according to the embodiment executes the air-fuel ratio control of the engine 11 for stabilizing the running state of the engine 11 executed primarily during a deceleration that is not a sudden deceleration of the vehicle (hereinafter, the simple term "deceleration" will refer to a decelerating state that is not a sudden decelerating state).

Figure 4:
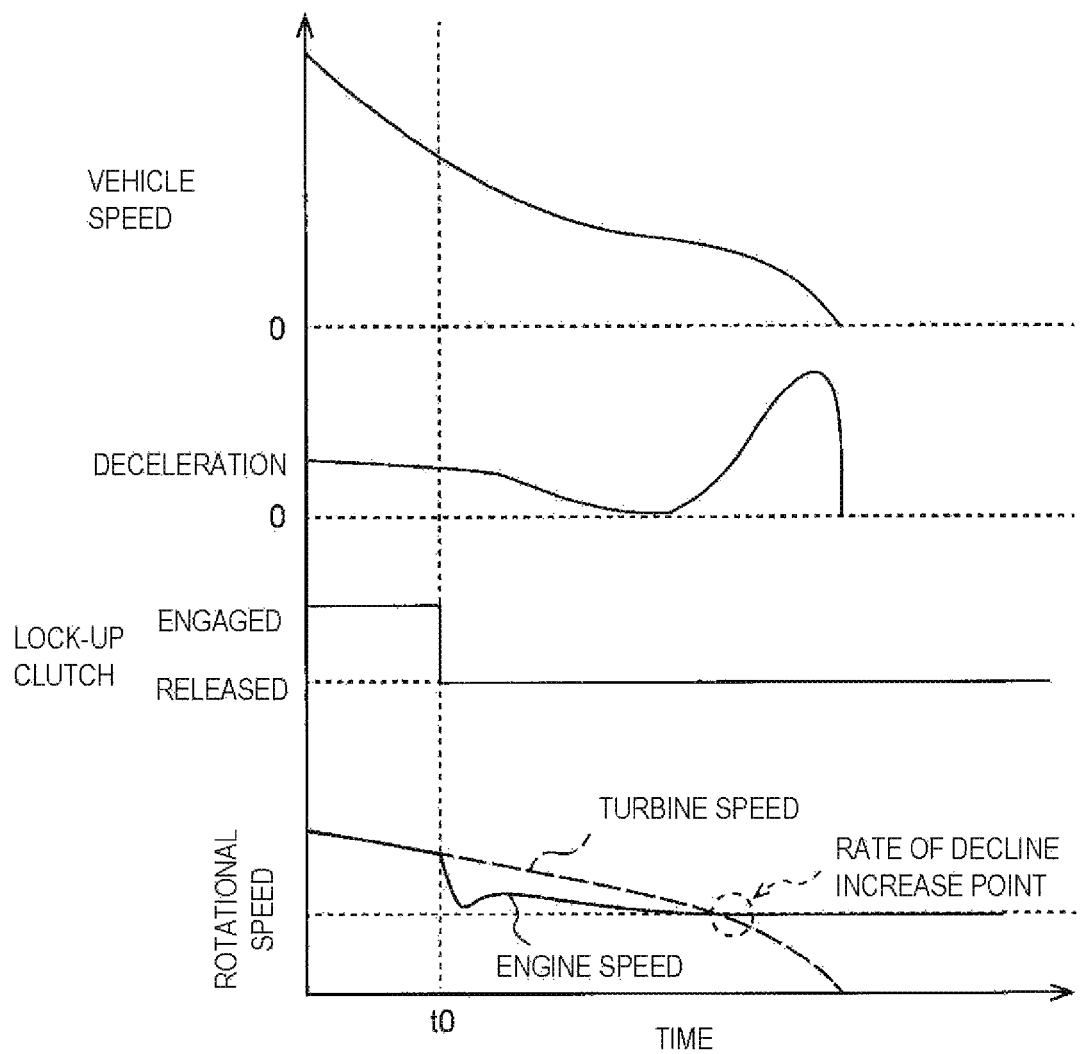
FIG. 4 is an explanatory diagram illustrating ideal engine speed behavior during deceleration of the vehicle.

FIG. 4 illustrates the ideal engine speed behavior in the case in which the vehicle decelerates under lean-burn control of the engine 11. When the lock-up clutch 25 is released at a time t0, because the turning force transmitted to the engine 11 from the driving wheels 51 and 53 through the CVT 30 decreases, the engine speed drops briefly. After that, the fuel injection feedback control is executed to keep the air-fuel ratio at the target lean air-fuel ratio, and the engine speed converges on a target speed while staying below the turbine speed. The target speed typically is the idle speed. With this arrangement, as the vehicle comes to a stop and the turbine speed reaches zero, the engine 11 continues to run without stalling.

Figure 5:
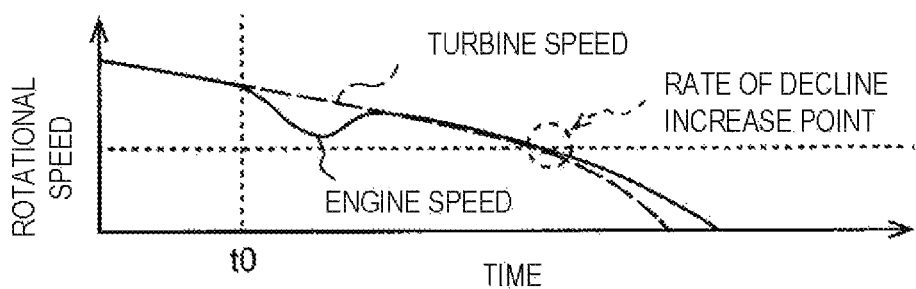
FIG. 5 is an explanatory diagram illustrating engine speed behavior at risk of an engine stall during deceleration of the vehicle.

FIG. 5 illustrates the engine speed behavior at risk of an engine stall in the case in which the vehicle decelerates under lean-burn control of the engine 11. After the lock-up clutch 25 is released at the time t0 and the engine speed drops briefly, when the fuel injection feedback control is executed to keep the air-fuel ratio at the target lean air-fuel ratio, the engine speed rises above the turbine speed. In this state, the engine speed is pulled down by the turbine speed, and there is a risk of an engine stall occurring.

Figure 6:
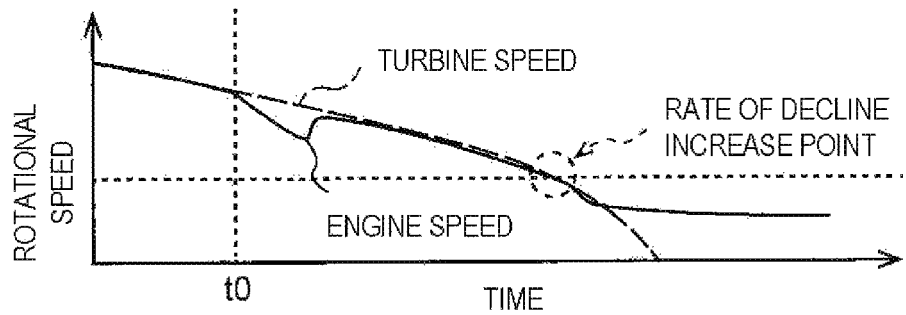
FIG. 6 is an explanatory diagram illustrating engine speed behavior during sudden deceleration of the vehicle.

FIG. 6 illustrates the engine speed behavior in the case in which the vehicle suddenly decelerates under lean-burn control of the engine 11. In the case in which the vehicle suddenly decelerates, the engine speed is more readily pulled down by the turbine speed, and an engine stall occurs more readily in association with the drop in the turbine speed.

Figure 7:
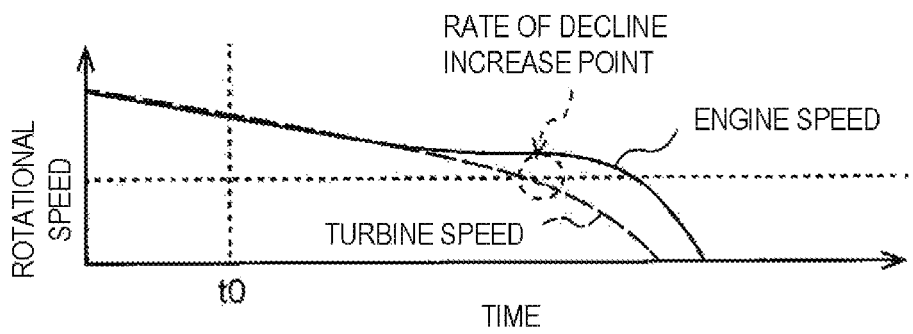
FIG. 7 is a diagram for explaining variations in engine speed behavior during deceleration of the vehicle.
Figure 8:
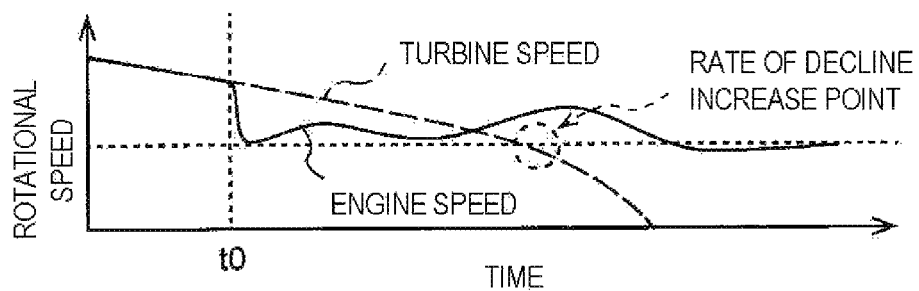
FIG. 8 is a diagram for explaining variations in engine speed behavior during deceleration of the vehicle.

FIGS. 7 and 8 illustrate the engine speed behavior in the case in which the vehicle decelerates under lean-burn control of the engine 11, and illustrate different engine speed behaviors due to inconsistencies among individual vehicles.

In the example illustrated in FIG. 7, the engine speed does not fall even when the lock-up clutch 25 is released at the time t0, but is pulled down by the turbine speed. Also, when the fuel injection feedback control is executed to keep the air-fuel ratio at the target lean air-fuel ratio, the engine speed rises substantially above the turbine speed. As a result, the engine speed is pulled down by the turbine speed, and there is a risk of an engine stall occurring.

In the example illustrated in FIG. 8, after the lock-up clutch 25 is released at the time t0 and the engine speed drops briefly, when the fuel injection feedback control is started to keep the air-fuel ratio at the target lean air-fuel ratio, the engine speed fluctuates unstably. Particularly, a surge of the engine speed is observed before reaching the rate-of-decline increase point of the turbine speed. A surge of the engine speed also leads to an increase in fuel consumption.

To correct the engine speed behaviors illustrated in FIGS. 5 to 8 and stabilize the running state of the engine 11, the control device 100 determines the running state of the engine 11, and in the case in which there is a risk that an engine stall or an engine speed surge will occur, the control device 100 cancels the lean-burn control and returns to the stoichiometric control.

(3-2. Flowchart)

Figure 9:
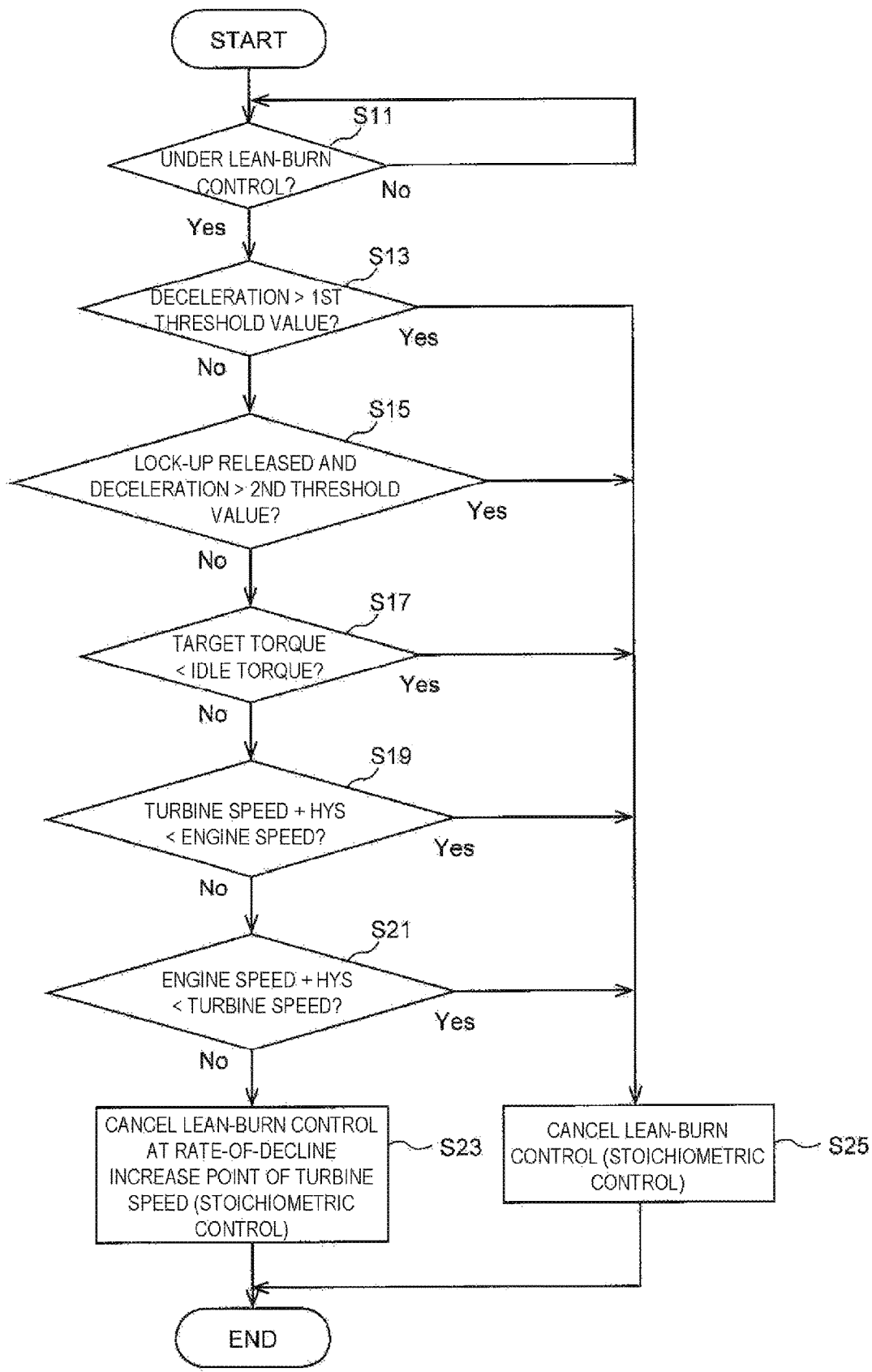
FIG. 9 is a flowchart illustrating one example of an engine air-fuel ratio control method according to the embodiment.

FIG. 9 is a flowchart illustrating one example of the process of controlling the air-fuel ratio of the engine 11 by the control device 100.

First, the lean-burn control canceler 121 determines whether the engine 11 is currently under lean-burn control (step S11). In the case in which the engine 11 is not under lean-burn control (S11/No), the lean-burn control canceler 121 repeats the determination in step S11 until the lean-burn control of the engine 11 is started.

On the other hand, in the case in which the engine 11 is under lean-burn control (S11/Yes), the engine stall predictor 119 determines whether the deceleration degree of the vehicle exceeds the first threshold value (step S13). The first threshold value is the threshold value for determining a sudden deceleration of the vehicle, and is preset to an appropriate value. For example, the first threshold value may be set to a value of deceleration at which an anti-locking brake system of the vehicle may act. Specifically, the first threshold value may be set to 10 m/s$^2$, for example.

In the case in which the deceleration degree of the vehicle exceeds the first threshold value (S13/Yes), there is a risk that the rate of decline of the turbine speed will rise above the rate of decline of the engine speed, the engine speed will be pulled down by the turbine speed, and an engine stall will occur. For this reason, the lean-burn control canceler 121 causes the engine 11 to be released from the lean-burn control and returned to the stoichiometric control to stabilize the running state of the engine 11 (step S25). With this arrangement, an engine stall during a sudden deceleration of the vehicle as illustrated in FIG. 6 may be avoided.

On the other hand, in the case in which the deceleration degree of the vehicle is the first threshold value or less (S13/No), the engine stall predictor 119 determines whether the lock-up clutch 25 is released and the deceleration degree of the vehicle also exceeds a second threshold value (step S15). The second threshold value is set to an appropriate value smaller than the first threshold value for determining a sudden deceleration. For example, the second threshold value is set to a value of deceleration at which the switch from the lean-burn control to the stoichiometric control may be completed by the time the turbine speed falls to the rate-of-decline increase point. Specifically, the second threshold value may be set to 4 m/s$^2$, for example.

In the case in which the lock-up clutch 25 is released and the deceleration degree of the vehicle also exceeds the second threshold value (S15/Yes), since ignition points are scarce in the domain of low engine speed during the lean-burn control, there is a risk that an engine stall will occur in association with the drop in the engine speed. For this reason, the lean-burn control canceler 121 causes the engine 11 to be released from the lean-burn control and returned to the stoichiometric control to stabilize the running state of the engine 11 (step S25).

In step S15, instead of determining whether the deceleration degree of the vehicle exceeds the second threshold value, it may be determined whether the intake amount has fallen below a reference value, or whether the rate of decline of the target torque has fallen below a reference value. Also, in step S15, instead of determining whether the deceleration degree of the vehicle exceeds the second threshold value, it may be determined whether the brake pressure of the vehicle exceeds a reference pressure (for example, 5 MPa), or whether the amount of manipulation of the brake pedal exceeds a reference value.

On the other hand, in the case of a negative determination in step S15 (S15/No), the engine stall predictor 119 determines whether the target torque set by the target torque setter 113 has fallen below the idle torque that maintains the engine speed at the idle speed (step S17).

In the case in which the target torque has fallen below the idle torque (S17/Yes), since ignition points are scarce in the domain of low engine speed during the lean-burn control, there is a risk that an engine stall will occur. For this reason, the lean-burn control canceler 121 causes the engine 11 to be released from the lean-burn control and returned to the stoichiometric control to stabilize the running state of the engine 11 (step S25).

Figure 10:
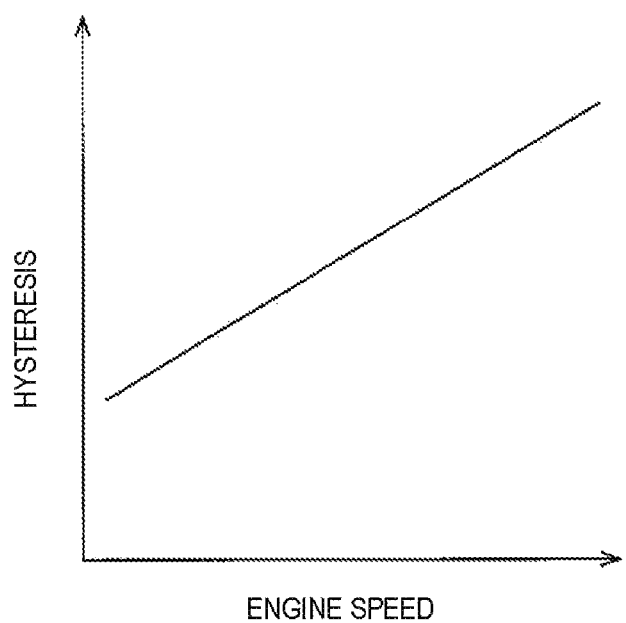
FIG. 10 is an explanatory diagram illustrating an example of the setting of a hysteresis value.

In the case in which the target torque is at or above the idle torque (S17/No), the lean-burn control canceler 121 determines whether the engine speed has risen above a value equal to the turbine speed plus a predetermined hysteresis value (step S19). The hysteresis value is set to predict a drop in the engine speed while also accounting for inconsistencies among individual vehicles and engines. As illustrated in FIG. 10, the hysteresis value may be set to a larger value as the engine speed becomes larger, and for example a value within a range from 5% to 15% of the engine speed may be set as the hysteresis value.

As illustrated in FIG. 4 and the like, after the release of the lock-up clutch 25, the engine speed exhibits a behavior of dropping briefly and then rising up again. For this reason, to make the determination in step S19 be executed after the engine speed rises up again, the determination in step S19 may be executed using the engine speed and the turbine speed at a point in time after a predetermined amount of time has elapsed or when the engine 11 has revolved a predetermined amount since the release of the lock-up clutch 25.

In the case in which the engine speed has risen above the value equal to the turbine speed plus the predetermined hysteresis value (S19/Yes), since there is a risk that the engine speed will be pulled down by the turbine speed and an engine stall will occur, the lean-burn control canceler 121 causes the engine 11 to be released from the lean-burn control and returned to the stoichiometric control to stabilize the running state of the engine 11 (step S25). With this arrangement, an engine stall during a deceleration of the vehicle as illustrated in FIG. 7 or a surge of the engine speed as illustrated in FIG. 8 may be avoided.

On the other hand, in the case in which the engine speed is equal to or less than the value of the turbine speed plus the predetermined hysteresis value (S19/No), the lean-burn control canceler 121 determines whether a value equal to the engine speed plus a predetermined hysteresis value has fallen below the turbine speed (step S21). The hysteresis value may be the same value as the hysteresis value used in step S19 (see FIG. 10), or a different value. Also, to make the determination in step S21 be executed after the engine speed rises up again, the determination in step S21 may be executed using the engine speed and the turbine speed at a point in time after a predetermined amount of time has elapsed or when the engine 11 has revolved a predetermined amount since the release of the lock-up clutch 25.

In the case in which the value equal to the engine speed plus the predetermined hysteresis value has fallen below the turbine speed (S21/Yes), since the engine speed may be judged to be in a surging state, the lean-burn control canceler 121 causes the engine 11 to be released from the lean-burn control and returned to the stoichiometric control to stabilize the running state of the engine 11 (step S25).

On the other hand, in the case in which the turbine speed is equal to or greater than the value of the engine speed plus the predetermined hysteresis value (S21/No), at the rate-of-decline increase point of the turbine speed (see FIG. 4) that appears immediately before the vehicle stops, the lean-burn control canceler 121 causes the engine 11 to be released from the lean-burn control and returned to the stoichiometric control to stabilize the running state of the engine 11 (step S23). In other words, the lean-burn control canceler 121 causes the lean-burn control to be canceled in the case in which the rate of decline of the turbine speed exceeds a threshold value by which the rate-of-decline increase point is determinable. With this arrangement, the risk that the engine speed will be pulled down by the turbine speed is reduced, and an engine stall may be avoided.

In this way, the control device 100 cancels the lean-burn control and returns to the stoichiometric control during a deceleration of the vehicle to stabilize the running state of the engine 11. With this arrangement, an engine stall or a surge of the engine speed may be inhibited. Consequently, the merchantability of the vehicle is improved, while in addition, the risk of increased fuel consumption due to a surge of the engine speed may be reduced.

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

For example, the control device 100 of vehicle in the above embodiment is provided with five controllers, but the disclosure is not limited to such an embodiment. The functions of some or all of the above controllers may also be unified in a single controller, or may be divided further into multiple controllers.

Also, in the above embodiment, the power transmission device that transmits power between the engine and the CVT is a torque converter equipped with a lock-up clutch, but the disclosure is not limited to such an embodiment. The disclosure is applicable to any vehicle provided with a power transmission device in which a rotary element on the engine side and a rotary element on the transmission side co-rotate even after the release of the clutch, such as a fluid clutch for example.

The invention claimed is:

1. An engine air-fuel ratio control device configured to be used in a vehicle comprising a power transmission device configured to transmit power between an output shaft of an engine and an input shaft of a transmission, the engine air-fuel ratio control device being configured to execute a lean-burn control that puts an air-fuel ratio of the engine into a lean state, the engine air-fuel ratio control device comprising:
   an engine controller configured to execute a fuel injection feedback control such that the air-fuel ratio becomes a lean target value after the power transmission device is released during a deceleration of the vehicle;
   an engine stall predictor configured to predict a stall of the engine on a basis of a deceleration indicator that is correlated with a deceleration degree of the vehicle in a state in which the power transmission device is released; and
   a lean-burn control canceler configured to cancel the lean-burn control in a case in which the engine is predicted to stall.

2. The engine air-fuel ratio control device according to claim 1, wherein
   the deceleration indicator is an amount of intake air of the engine, a target torque of the engine, the deceleration degree of the vehicle, an amount of manipulation of the brake pedal, or a brake pressure of the vehicle.

3. The engine air-fuel ratio control device according to claim 2, wherein
   the engine stall predictor is configured to predict that the engine will stall when, in the released state of the power transmission device, the amount of intake air of the engine is a reference value or less, a rate of decline of the target torque of the engine is a reference value or greater, the deceleration degree of the vehicle is a reference value or greater, the amount of manipulation of the brake pedal is a reference value or greater, or the brake pressure of the vehicle is a reference pressure or greater.

4. The engine air-fuel ratio control device according to claim 3, wherein
   the lean-burn control canceler is additionally configured to cancel the lean-burn control in a case in which, in the released state of the power transmission device, a demanded torque of the engine has fallen below an idle torque of the engine.

5. The engine air-fuel ratio control device according to claim 3, wherein
   a rotational speed of the output shaft of the engine exhibits a behavior of dropping briefly due to the release of the power transmission device and then rising up again, and
   the lean-burn control canceler is additionally configured to cancel the lean-burn control in a case in which the rotational speed of the output shaft of the engine after rising up again exceeds a value equal to a rotational speed of the input shaft of the transmission plus a predetermined hysteresis value.

6. The engine air-fuel ratio control device according to claim 3, wherein
   a rotational speed of the output shaft of the engine exhibits a behavior of dropping briefly due to the release of the power transmission device and then rising up again, and the lean-burn control canceler is additionally configured to cancel the lean-burn control in a case in which a value equal to a rotational speed of the output shaft of the engine after rising up again plus a predetermined hysteresis value falls below a rotational speed of the input shaft of the transmission.

7. The engine air-fuel ratio control device according to claim 3, wherein
the lean-burn control canceler is additionally configured to cancel the lean-burn control in a case in which, in the released state of the power transmission device, a rate of decline of a rotational speed of the input shaft of the transmission exceeds a threshold value.

8. The engine air-fuel ratio control device according to claim 3, wherein
the power transmission device comprises a first rotary element coupled to the output shaft of the engine and a second rotary element coupled to the input shaft of the transmission, and
the first rotary element and the second rotary element co-rotate according to each other's rotation even in the released state of the power transmission device.

9. The engine air-fuel ratio control device according to claim 2, wherein
the lean-burn control canceler is additionally configured to cancel the lean-burn control in a case in which, in the released state of the power transmission device, a demanded torque of the engine has fallen below an idle torque of the engine.

10. The engine air-fuel ratio control device according to claim 2, wherein
a rotational speed of the output shaft of the engine exhibits a behavior of dropping briefly due to the release of the power transmission device and then rising up again, and
the lean-burn control canceler is additionally configured to cancel the lean-burn control in a case in which the rotational speed of the output shaft of the engine after rising up again exceeds a value equal to a rotational speed of the input shaft of the transmission plus a predetermined hysteresis value.

11. The engine air-fuel ratio control device according to claim 2, wherein
a rotational speed of the output shaft of the engine exhibits a behavior of dropping briefly due to the release of the power transmission device and then rising up again, and
the lean-burn control canceler is additionally configured to cancel the lean-burn control in a case in which a value equal to a rotational speed of the output shaft of the engine after rising up again plus a predetermined hysteresis value falls below a rotational speed of the input shaft of the transmission.

12. The engine air-fuel ratio control device according to claim 2, wherein
the lean-burn control canceler is additionally configured to cancel the lean-burn control in a case in which, in the released state of the power transmission device, a rate of decline of a rotational speed of the input shaft of the transmission exceeds a threshold value.

13. The engine air-fuel ratio control device according to claim 2, wherein
the power transmission device comprises a first rotary element coupled to the output shaft of the engine and a second rotary element coupled to the input shaft of the transmission, and
the first rotary element and the second rotary element co-rotate according to each other's rotation even in the released state of the power transmission device.

14. The engine air-fuel ratio control device according to claim 1, wherein
the lean-burn control canceler is additionally configured to cancel the lean-burn control in a case in which, in the released state of the power transmission device, a demanded torque of the engine has fallen below an idle torque of the engine.

15. The engine air-fuel ratio control device according to claim 1, wherein
a rotational speed of the output shaft of the engine exhibits a behavior of dropping briefly due to the release of the power transmission device and then rising up again, and
the lean-burn control canceler is additionally configured to cancel the lean-burn control in a case in which the rotational speed of the output shaft of the engine after rising up again exceeds a value equal to a rotational speed of the input shaft of the transmission plus a predetermined hysteresis value.

16. The engine air-fuel ratio control device according to claim 1, wherein
a rotational speed of the output shaft of the engine exhibits a behavior of dropping briefly due to the release of the power transmission device and then rising up again, and
the lean-burn control canceler is additionally configured to cancel the lean-burn control in a case in which a value equal to a rotational speed of the output shaft of the engine after rising up again plus a predetermined hysteresis value falls below a rotational speed of the input shaft of the transmission.

17. The engine air-fuel ratio control device according to claim 1, wherein
the lean-burn control canceler is additionally configured to cancel the lean-burn control in a case in which, in the released state of the power transmission device, a rate of decline of a rotational speed of the input shaft of the transmission exceeds a threshold value.

18. The engine air-fuel ratio control device according to claim 1, wherein
the power transmission device comprises a first rotary element coupled to the output shaft of the engine and a second rotary element coupled to the input shaft of the transmission, and
the first rotary element and the second rotary element co-rotate according to each other's rotation even in the released state of the power transmission device.

19. An engine air-fuel ratio control device configured to be used in a vehicle comprising a power transmission device configured to transmit power between an output shaft of an engine and an input shaft of a transmission, the engine air-fuel ratio control device being configured to execute a lean-burn control that puts an air-fuel ratio of the engine into a lean state, the engine air-fuel ratio control device comprising circuitry configured to
execute a fuel injection feedback control such that the air-fuel ratio becomes a lean target value after the power transmission device is released during a deceleration of the vehicle;
predict a stall of the engine on a basis of a deceleration indicator that is correlated with a deceleration degree of the vehicle in a state in which the power transmission device is released; and cancel the lean-burn control in a case in which the engine is predicted to stall.

* * * * *